United States Patent [19]

Iketani et al.

[11] Patent Number: 5,643,687
[45] Date of Patent: Jul. 1, 1997

[54] MAGNETO-OPTIC MEMORY MEDIUM AND A METHOD FOR PRODUCING THE SAME

[75] Inventors: Naoyasu Iketani, Tenri; Hiroyuki Katayama, Nara; Junichiro Nakayama; Kenji Ohta, both of Nara-ken, all of Japan

[73] Assignee: Sharp Kabushiki Kaisha, Osaka, Japan

[21] Appl. No.: 358,682

[22] Filed: Dec. 19, 1994

Related U.S. Application Data

[63] Continuation of Ser. No. 30,721, Mar. 12, 1993, abandoned.

[30] Foreign Application Priority Data

Mar. 13, 1992 [JP] Japan .................................. 4-054622

[51] Int. Cl.$^6$ ............................................. G11B 5/66
[52] U.S. Cl. ..................... 428/694 ML; 428/212; 428/213; 428/332; 428/336; 428/694 NF; 428/694 DE; 428/694 XS; 428/900; 427/128; 427/129; 427/130; 427/131; 204/192.1; 204/192.12; 204/192.2; 204/192.26
[58] Field of Search ............... 428/694 ML, 212, 428/213, 694 NF, 694 DE, 694 XS, 332, 336, 900; 422/128, 129, 130, 131; 204/192.1, 192.12, 192.2, 192.26

[56] References Cited

U.S. PATENT DOCUMENTS

| | | | |
|---|---|---|---|
| 4,711,821 | 12/1987 | Kikuchi et al. | 428/457 |
| 4,775,603 | 10/1988 | Fujii | 428/694 DE |
| 4,800,112 | 1/1989 | Kano et al. | 428/163 |
| 4,861,671 | 8/1989 | Muchnik et al. | 428/457 |
| 4,939,023 | 7/1990 | Omata et al. | 428/215 |
| 4,994,330 | 2/1991 | Steininger | 428/336 |
| 5,228,024 | 7/1993 | Moon et al. | 369/288 |

FOREIGN PATENT DOCUMENTS

| | | |
|---|---|---|
| 59-110052 | 6/1984 | Japan . |
| 61-227243 | 9/1986 | Japan . |

OTHER PUBLICATIONS

English Abstract of JP—61-227,243 dated Sep. 10, 1986.
Tu Chen et al., "An Investigation of Amorphous Tb–Fe Thin Films for Magneto–Optic Memory Application", IEEE. Transaction on Magnetics, vol. MAG–16, No. 5, Sep. 1980, pp. 1194–1196.

*Primary Examiner*—Leszek Kiliman

[57] ABSTRACT

A magneto-optic memory medium including a first dielectric layer having a first main surface and a second main surface; a second dielectric layer for covering the first main surface of the first dielectric layer; and a magneto-optic memory layer for covering the second dielectric layer. The first dielectric layer is formed of an oxide having a refractive index in the range of 2.4 or more and 3.5 or less, and the second dielectric layer is formed of a material containing no oxygen. The magneto-optic memory medium is produced by the steps of forming a first layer by performing reactive sputtering in an atmosphere of a first sputter gas using a material containing a first element as a target; switching the first sputter gas to a second sputter gas; forming a second layer on the first layer by performing reactive sputtering in an atmosphere of the second sputter gas using a material containing the first element as a target; and forming a magneto-optic memory layer on the second dielectric layer.

17 Claims, 2 Drawing Sheets

MAGNETO-OPTIC MEMORY MEDIUM AND A METHOD FOR PRODUCING THE SAME

This application is continuation, of application Ser. No. 08/030,721 filed on Mar. 12, 1993, now abandoned.

BACKGROUND OF THE INVENTION

1. Field of the Invention

The present invention relates to a magneto-optic memory medium for recording, reproducing and erasing data using a laser, and a method for producing the same.

2. Description of the Related Art

As a magneto-optic memory material for use in a rewritable magneto-optic disc utilizing magneto-optical effects, rare earth transition metal films are actively studied and tried for practical use. However, the rare earth transition metal films involve problems in that the reliability is low due to a poor corrosion resistance and the level of a reproduced signal is low due to a small Kerr rotation angle. An increased level of the reproduced signal requires an enlarged Kerr rotation angle. In order to achieve a large apparent Kerr rotation angle, a reflection prevention structure including a magneto-optic memory layer and a dielectric layer (see, for example, IEEE Trans. Magn. MAG-16, p. 1194 (1980)), or a reflection film structure including a magneto-optic memory layer, a dielectric layer and a reflection layer are adopted to a magneto-optic memory medium. In order to increase the corrosion resistance and thus to raise the reliability, a passivation layer is adopted for covering a magneto-optic memory layer.

As is apparent from the above description, enlargement of the Kerr rotation angle is an important factor for the development of magneto-optic discs. Enlargement of a Kerr rotation angle requires raising the refractive index of a dielectric layer so as to utilize the enhancement effect to an utmost extent, which increases an apparent Kerr rotation angle (hereinafter, referred to simply as the "enhancement effect").

FIG. 4 shows a construction of an example of a conventional magneto-optic memory medium described in Japanese Laid-Open Patent Publication No. 59-110052. The magneto-optic memory medium includes a light transmitting substrate 1, a first dielectric layer 10 provided on the light transmitting substrate 1, a magneto-optic memory layer 4 provided on the first dielectric layer 10, a second dielectric layer 11 provided on the magneto-optic memory layer 4, and a reflection layer 6 provided on the second dielectric layer 11. The first dielectric layer 10 and the second dielectric layer 11 are formed of, for example, AlN.

Conventionally, in addition to AlN used in the example shown in FIG. 4, nitrides such as AlSiN and SiN and oxides such as $Al_2O_3$ and SiO have been used for the dielectric layer. All of these materials have a refractive index of approximately 1.5 to 2.0, which is not sufficient to utilize the enhancement effect to an utmost extent. Oxides such as $TiO_2$ and $BaTiO_3$ have a high refractive index of approximately 2.4 to 2.6, but have not been used since free oxygen generated during the layer formation has an adverse effect on the protection of the magneto-optic memory layer, and thus lower the corrosion resistance and the reliability of the magneto-optic memory medium.

SUMMARY OF THE INVENTION

A magneto-optic memory medium according to the present invention includes a first dielectric layer having a first main surface and a second main surface; a second dielectric layer for covering the first main surface of the first dielectric layer; and a magneto-optic memory layer for covering the second dielectric layer. The first dielectric layer is formed of an oxide having a refractive index in the range of 2.4 or more and 3.5 or less, and the second dielectric layer is formed of a material containing no oxygen.

A method for producing a magneto-optic memory medium according to the present invention includes the steps of forming a first layer by performing reactive sputtering in an atmosphere of a first sputter gas using a material containing a first element as a target; switching the first sputter gas to a second sputter gas; forming a second layer on the first layer by performing reactive sputtering in an atmosphere of the second sputter gas using a material containing the first element as a target; and forming a magneto-optic memory layer on the second dielectric layer.

According to the present invention, a first dielectric layer is formed of, for example, $TiO_2$, having a higher refractive index than nitrides and oxides which have conventionally been used. Thus, the enhancement effect can be utilized to an utmost extent. A second dielectric layer is formed of a material having no oxygen, for example, TiN. Thus, a magneto-optic having an excellent corrosion resistance can be obtained.

The enhancement effect is more utilized as the refractive index of the dielectric layer is raised.

In IEEE Trans. Magn. MAG-16, p. 1194 (1980), SiO is used for a dielectric layer in order to utilize the enhancement effect to an utmost extent. SiO has a refractive index of approximately 1.7 while $TiO_2$ used for the first dielectric layer according to the present invention has a refractive index of approximately 2.54. This comparison indicates that the enhancement effect is utilized more in a magneto-optic memory medium according to the present invention than in a medium described in the above literature.

In Japanese Laid-Open Patent Publication No. 59-110052, AlN is used for a dielectric layer in order to utilize the enhancement effect to an utmost extent. Since AlN has a refractive index of approximately 2.0, the enhancement effect is utilized more in a magneto-optic memory medium according to the present invention than in the medium described in Japanese Laid-Open Patent Publication No. 59-110052.

Further, the dielectric layer is desirably transparent. A SiO film, a $TiO_2$ film, and an AlN film are all transparent. Although the TiN film used for the second dielectric layer according to the present invention is not transparent, the TiN film has a minimum possible thickness in order to prevent the restriction of the enhancement effect. TiN is used according to the present invention for the following reason. A dielectric film, which is in contact with the magneto-optic memory layer, is required to have the function of protecting the magneto-optic memory layer. In order to prevent oxidation of the magneto-optic memory medium, the dielectric film desirably contains no oxygen. Consequently, the magneto-optic memory medium according to the present invention includes a second dielectric layer containing TiN to be in contact with the magneto-optic memory layer.

Still further, according to the present invention, the first dielectric layer and the second dielectric layer are formed of such materials that allow layer formation using an identical substance as a target, for example, $TiO_2$ and TiN, respectively. Due to such a composition, the first dielectric layer can be formed by performing reactive sputtering using Ti as a target in an atmosphere of a gas containing $O_2$, and then the second dielectric layer can be formed sequentially performing reactive sputtering, also using Ti as a target with only a change in the sputter gas from a gas containing $O_2$ to a gas containing $N_2$.

Such sequential layer formation can be used in a multiple-layered film including Ti and $TiO_2$, Ti and TiN, $SiO_2$ and SiN, $Al_2O_3$ and AlN, and the like.

Thus, the invention described herein makes possible the advantage of providing a magneto-optic memory medium which generates reproduced signals having a high level, and has an excellent corrosion resistance and a high reliability, and a simple and low-cost method for producing such a magneto-optic memory medium.

This and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrating examples with reference to the accompanying drawings.

EXAMPLE 1

Figure 1:
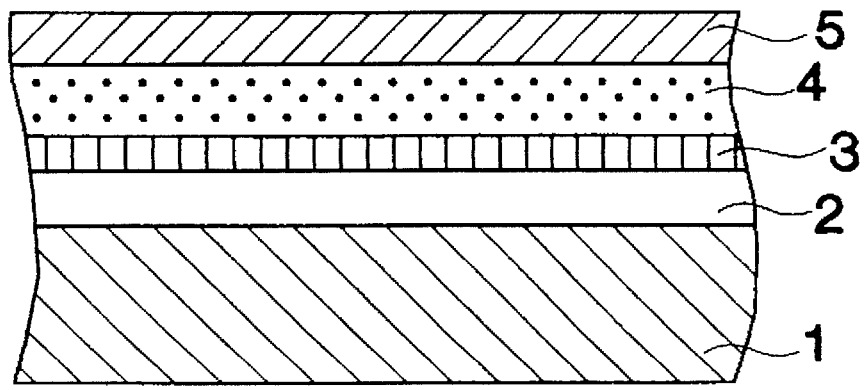
FIG. 1 is a schematic cross sectional view of a magneto-optic memory medium according to a first example of the present invention.

FIG. 1 shows a construction of a magneto-optic memory medium according to a first example of the present invention.

As is shown in FIG. 1, the magneto-optic memory medium according to the first example includes a light transmitting substrate 1, a first dielectric layer 2 provided on the light transmitting substrate 1, a second dielectric layer 3 provided on the first dielectric layer 2, a magneto-optic memory layer 4 provided on the second dielectric layer 3, and a passivation layer 5 provided on the magneto-optic memory layer 4. The first dielectric layer 2, the second dielectric layer 3, and the magneto-optic memory layer 4 constitute a reflection prevention structure.

The magneto-optic memory medium having the above-mentioned construction is produced in the following manner.

The light transmitting substrate 1 is formed of, for example, a synthetic resin such as a polycarbonate resin, an acrylic resin, or a non-crystalline polyolefin, or glass. On the light transmitting substrate 1, the first dielectric layer formed of, for example, $TiO_2$ is laminated, and then a second dielectric layer 3 formed of, for example, TiN is laminated on the first dielectric layer 2. On the second dielectric layer 3, the magneto-optic memory layer 4 is laminated. The magneto-optic memory layer 4 is formed of, for example, a TbFeCo film, a DyTeCo film, or a GdTbFe film, or a Pt/Co multi-layer film. On the magneto-optic memory layer 4, the passivation layer 5 formed of, for example, AlN or AlSiN is laminated.

The first dielectric layer 2 and the second dielectric layer 3 are formed in the following manner.

The first dielectric layer 2 is formed by performing reactive sputtering using Ti as a target in an atmosphere of (Ar+$O_2$) gas at a sputtering power of 0.3 to 0.6 kW, a sputtering pressure of 2.5 to 3.0 mTorr, and a partial pressure of $O_2$ of 0.8 to 1.0 mTorr. The light transmitting first dielectric layer 2 thus obtained has a refractive index n=2.54.

Next, the second dielectric layer 3 is formed by performing reactive sputtering using Ti as a target as in the case of the first dielectric layer 2, in an atmosphere of $N_2$ gas.

The first dielectric layer 2 preferably has a thickness in the range of 50.0 to 60.0 nm in order to utilize the enhancement effect realized by the reflection prevention structure to an utmost extent. The thickness of the second dielectric layer 3 is preferably set to a range of 1.0 to 6.0 nm in order to restrict the adverse effect of the free oxygen from the first dielectric layer 2 as well as to minimize the absorption loss at the second dielectric layer 3. It is desirable that the second dielectric layer 3, which is formed of TiN and is not transparent, has a minimum possible thickness, since the dielectric layers are desirably transparent in order to prevent the restriction of the enhancement effect. Further, the thickness of the second dielectric layer 3 is set so that a reproduced signal of the magneto-optic memory medium has a substantially identical with or higher level than the reproduced signal of a conventional medium. Table 1 shows the thickness of the second dielectric layer 3, the level of the reproduced signal $\sqrt{R}\theta_k$, the refractive index R, and the Kerr rotation angle $\theta_k$ obtained by measurement of the magneto-optic memory medium according to the first example.

TABLE 1

| Thickness of the second dielectric layer (TiN) | R | $\theta_k$ | $\sqrt{R}\ \theta_k$ |
| --- | --- | --- | --- |
| 1.0 nm | 0.11 | 1.4 | 0.46 |
| 6.0 nm | 0.14 | 1.1 | 0.41 |

As the thickness of the second dielectric layer 3 is changed from 1.0 nm to 6.0 nm, the level of the reproduced signal $\sqrt{R}\theta_k$ is changed from 0.46 to 0.41. On the contrary, a conventional medium including a dielectric layer and a passivation layer formed of AlN has a level $\sqrt{R}\theta_k$ of the reproduced signal of approximately 0.39. This comparison indicates that the magneto-optic memory medium including the second dielectric layer 3 having a thickness of 1.0 to 6.0 nm according to the first example has an improved level of the reproduced signal compared with the conventional medium.

Moreover, the first dielectric layer 2 constituting the reflection prevention structure is formed of $TiO_2$ to realize a refractive index of as high as 2.54. Accordingly, the magneto-optic memory medium has an apparent Kerr rotation angle which is approximately 32 to 66% larger than that of a conventional medium including a dielectric layer formed of AlN having a refractive index n=2.05. The optical absorption of the magneto-optic memory layer 4 is also increased by a maximum of approximately 14%, and the level of the reproduced signal is raised by a maximum of approximately 1.4 dB compared with a conventional one.

The production process is relatively easy since the first dielectric layer 2 formed of $TiO_2$ and the second dielectric layer 3 formed of TiN are both formed by using Ti as a target. By switching the (Ar+O$_2$) gas into the N$_2$ gas, for example, gradually, the composition of the first dielectric layer 2 can be changed into the composition of the second dielectric layer 3 sequentially to some extent. Thus, the internal pressure of both of the layers 2 and 3 can be alleviated. Since the second dielectric layer 3 containing no oxygen prevents oxygen in the first dielectric layer 2 and outside air from being mixed into the magneto-optic memory layer 4 during the formation of the magneto-optic memory layer 4, an excellent corrosion resistance and a high reliability can be realized.

Instead of TiO$_2$, the first dielectric layer 2 may contain any other material which has a high refractive index in the range of 2.4 or more and 3.5 or less and has substantially no optical absorption, such as BaTiO$_3$, SrTiO$_3$, or Fe$_2$O$_3$. The second dielectric layer 3 has a minimum possible thickness which provides a negligible level of optical absorption. Instead of TiN, the second dielectric layer 3 may be formed of SiN, AlSiN, BN, ZnS, MgF$_2$, or LiF. Material for the first dielectric layer 2 and the second dielectric layer 3 are not limited to the above-mentioned ones.

EXAMPLE 2

Figure 2:
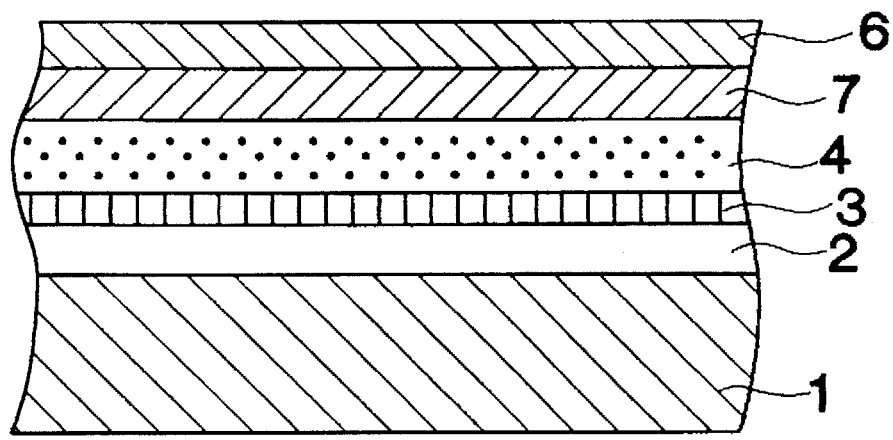
FIG. 2 is a schematic cross sectional view of a magneto-optic memory medium according to a second example of the present invention.

FIG. 2 shows a construction of a magneto-optic memory medium according to a second example of the present invention.

The magneto-optic memory medium according to the second example includes a light transmitting substrate 1, a first dielectric layer 2, a second dielectric layer 3, a magneto-optic memory layer 4, a third dielectric layer 7, and a reflection layer 6 which are sequentially laminated in this order from bottom to the top.

The magneto-optic memory medium having the above-mentioned construction is produced in the following manner.

The light transmitting substrate 1, the first dielectric layer 2, the second dielectric layer 3, and the magneto-optic memory layer 4 are laminated in the same manner as in the first example. Then, the third dielectric layer 7 formed of, for example, LiF or MgF$_2$ having a smaller refractive index than that of the first dielectric layer 2 is laminated on the magneto-optic memory layer 4. After that, the reflection layer 6 formed of, for example, Al, Ta, SUS, Ti, Au, Cu or Ag is laminated on the third dielectric layer 7. As in the first example, the first dielectric layer 2 and the second dielectric layer 3 are formed of, for example, TiO$_2$ and TiN, respectively, and the production methods thereof are identical with those in the first example. The first dielectric layer 2, the second dielectric layer 3, and the magneto-optic memory layer 4 constitute a reflection prevention structure.

The first dielectric layer 2 preferably has a thickness in the range of 45.0 to 55.0 nm in order to utilize the enhancement effect realized by the reflection prevention structure to an utmost extent. The thickness of the second dielectric layer 3 is preferably set to a range of 1.0 to 5.0 nm in order to restrict the adverse affect of the free oxygen from the first dielectric layer 2 as well as to minimize the absorption loss at the second dielectric layer 3. It is desirable that the second dielectric layer 3, which is formed of TiN and is not transparent, has a minimum possible thickness, since the dielectric layers are desirably transparent in order to prevent the restriction of the enhancement effect. Further, the thickness of the second dielectric layer 3 is set so that a reproduced signal of the magneto-optic memory medium has a substantially identical with or higher level than the reproduced signal of a conventional medium. Table 2 shows the thickness of the second dielectric layer 3, the level of the reproduced signal $\sqrt{R}\theta_k$, the refractive index R, and the Kerr rotation angle $\theta_k$ obtained by measurement of the magneto-optic memory medium according to the second example.

TABLE 2

| Thickness of the second dielectric layer (TiN) | R | $\theta_k$ | $\sqrt{R}\,\theta_k$ |
| --- | --- | --- | --- |
| 1.0 nm | 0.09 | 1.7 | 0.51 |
| 4.0 nm | 0.11 | 1.5 | 0.49 |

As the thickness of the second dielectric layer 3 is changed from 1.0 nm to 4.0 nm, the level of the reproduced signal $\sqrt{R}\theta_k$ is changed from 0.51 to 0.49. On the contrary, a conventional medium including a dielectric layer and a passivation layer formed of AlN and a reflection layer formed of Al has a level $\sqrt{R}\theta_k$ of the reproduced signal of approximately 0.495. This comparison indicates that the magneto-optic memory medium including the second dielectric layer 3 having a thickness of 1.0 to 5.0 nm according to the second example has an improved level of the reproduced signal compared with the conventional medium. The level of the reproduced signal $\sqrt{R}\theta_k$ did not show a big difference when the thickness of the second dielectric layer 3 was changed from 4.0 nm to 5.0 nm.

Moreover, the first dielectric layer 2 constituting the reflection prevention structure is formed of TiO$_2$ in order to realize a refractive index of as high as 2.54. Accordingly, the magneto-optic memory medium has an apparent Kerr rotation angle which is approximately 40 to 50% larger than that of a conventional medium including a dielectric layer formed of AlN having a refractive index n=2.05. The optical absorption of the magneto-optic memory layer 4 is also increased by a maximum of approximately 10%, and the level of the reproduced signal is raised by a maximum of approximately 1.0 dB compared with a conventional one. According to the second example, the Faraday effect obtained when light is transmitted through the magneto-optic memory layer 4 is superimposed on the Kerr magneto-optic effect. Such a superimposition results in an apparent Kerr rotation angle that is still larger and the level of the reproduced signal that is still higher than in the first example. As a result, an excellent corrosion resistance and a high reliability can be realized.

Instead of TiO$_2$, the first dielectric layer 2 may be formed of any other material which provides a high refractive index in the range of 2.4 or more and 3.5 or less and has substantially no optical absorption, such as BaTiO$_3$, SrTiO$_3$, or Fe$_2$O$_3$. The second dielectric layer 3 has a minimum possible thickness which provides a negligible level of optical absorption. Instead of TiN, the second dielectric layer 3 may be formed of SiN, AlSiN, BN, ZnS, MgF$_2$, or LiF. Material for the first dielectric layer 2, the second dielectric layer 3, and the third dielectric layer 7 are not limited to the above-mentioned ones.

EXAMPLE 3

Figure 3:
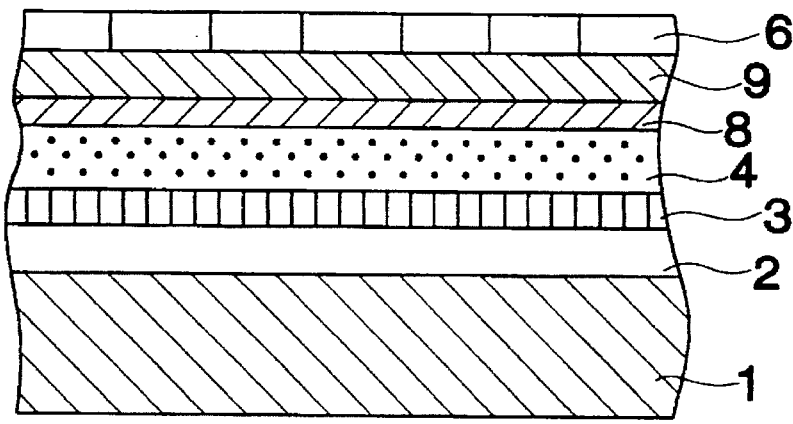
FIG. 3 is a schematic cross sectional view of a magneto-optic memory medium according to a third example of the present invention.
Figure 4:
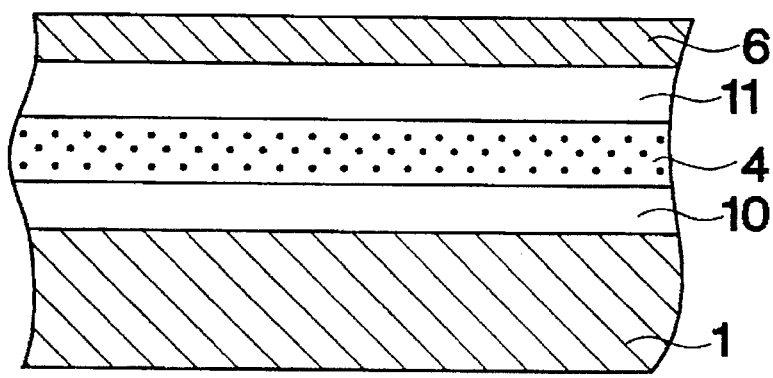
FIG. 4 is a schematic cross sectional view of an example of a conventional magneto-optic memory medium.

FIG. 3 shows a construction of a magneto-optic memory medium according to a third example of the present invention.

The magneto-optic memory medium according to the third example includes a light transmitting substrate 1, a first dielectric layer 2, a second dielectric layer 3, a magneto-optic memory layer 4, a third dielectric layer 8, a fourth dielectric layer 9, and a reflection layer 6 which are sequentially laminated in this order from bottom to the top.

As in the first example, the first dielectric layer 2 and the second dielectric layer 3 are formed of, for example, $TiO_2$ and TiN, respectively, and the production methods thereof are identical with those in the first example. The third dielectric layer 8 is formed of, for example, SiN, and the fourth dielectric layer 9 is formed of a material having a smaller refractive index than that of the first dielectric layer 2, namely, $SiO_2$ in the third example. The first dielectric layer 2, the second dielectric layer 3, and the magneto-optic memory layer 4 constitute a reflection prevention structure.

The magneto-optic memory medium having the above-mentioned construction is produced in the following manner.

The light transmitting substrate 1, the first dielectric layer 2, the second dielectric layer 3, and the magneto-optic memory layer 4 are laminated in the same manner as in the first example. Then, the third dielectric layer 8 is laminated on the magneto-optic memory layer 4 by performing reactive sputtering using Si as a target in an atmosphere of $N_2$ gas. The fourth dielectric layer 9 is laminated on the third dielectric layer 8 by performing reactive sputtering using Si as in the case in the third dielectric layer 8, in an atmosphere of $(Ar+O_2)$ gas. After that, the reflection layer 6 formed of, for example, Al, Ta, SUS, Ti, Au, Cu or Ag is laminated on the fourth dielectric layer 9.

The thickness of the third dielectric layer 8 is set so that the third dielectric layer 8 will prevent oxygen in the fourth dielectric layer 9 from being mixed into the magneto-optic memory layer 4 during the formation of the fourth dielectric layer 9, preferably to 1.0 to 10.0 nm.

The first dielectric layer 2 preferably has a thickness in the range of 45.0 to 50.0 nm in order to utilize the enhancement effect realized by the reflection prevention structure to an utmost extent. The thickness of the second dielectric layer 3 is preferably set to the range of 1.0 to 12.0 nm in order to restrict the adverse affect of the free oxygen from the free oxygen from the first dielectric layer 2 as well as to minimize the absorption loss at the second dielectric layer 3. It is desirable that the second dielectric layer 3, which is formed of TiN and is not transparent, has a minimum possible thickness, since the dielectric layers are desirably transparent in order to prevent the restriction of the enhancement effect. Further, the thickness of the second dielectric layer 3 is set so that a reproduced signal of the magneto-optic memory medium has a substantially identical with or higher level than the reproduced signal of a conventional medium. Table 3 shows the thickness of the second dielectric layer 3, the level of the reproduced signal $\sqrt{R}\theta_k$, the refractive index R, and the Kerr rotation angle $\theta_k$ obtained by measurement of the magneto-optic memory medium according to the third example.

TABLE 3

| Thickness of the second dielectric layer (TiN) | R | $\theta_k$ | $\sqrt{R}\ \theta_k$ |
| --- | --- | --- | --- |
| 1.0 nm | 0.003 | 11.7 | 0.64 |
| 12.0 nm | 0.037 | 2.6 | 0.50 |

As the thickness of the second dielectric layer 3 is changed from 1.0 nm to 12.0 nm, the level of the reproduced signal $\sqrt{R}\theta_k$ is changed from 0.64 to 0.50. On the contrary, a conventional medium including a dielectric layer and a passivation layer formed of AlN and a reflection layer formed of Al has a level $\sqrt{R}\theta_k$ of the reproduced signal of approximately 0.495. This comparison indicates that the magneto-optic memory medium including the second dielectric layer 3 having a thickness of 1.0 to 12.0 nm according to the third example has an improved level of the reproduced signal compared with the conventional medium.

Moreover, the first dielectric layer 2 constituting the reflection prevention structure is formed of $TiO_2$ to realize a refractive index of as high as 2.54. Accordingly, the magneto-optic memory medium has an apparent Kerr rotation angle which is approximately 10 times larger than that of a conventional medium including a dielectric layer formed of AlN having a refractive index n=2.05. The optical absorption of the magneto-optic memory layer 4 is also increased by a maximum of approximately 30%, and the level of the reproduced signal is raised by a maximum of approximately 1.8 dB compared with a conventional one. As a result, an excellent corrosion resistance and a high reliability can be realized.

Instead of $TiO_2$, the first dielectric layer 2 may be formed of any other material which provides a high refractive index in the range of 2.4 or more and 3.5 or less and has substantially no optical absorption, such as $BaTiO_3$, $SrTiO_3$, or $Fe_2O_3$. The second dielectric layer 3 has a minimum possible thickness which provides a negligible level of optical absorption. Instead of TiN, the second dielectric layer 3 may be formed of SiN, AlSiN, BN, ZnS, $MgF_2$, or LiF. Material for the first dielectric layer 2, the second dielectric layer 3, the third dielectric layer 8, and the fourth dielectric layer 9 are not limited to the above-mentioned ones.

A magneto-optic memory medium according to the present invention includes a first dielectric layer containing an oxide having a refractive index in the range of 2.4 or more and 3.5 or less and a second dielectric layer containing no oxygen provided between the first dielectric layer and a magneto-optic memory layer. By such a construction, the enhancement effect can be utilized to an utmost extent, the level of the reproduced signal can be raised, and an excellent corrosion resistance and a high reliability can be realized. Further, in the case when the first and the second dielectric layers are formed of materials which allow the use of an identical substance as a target, for example, in the case when the first dielectric layer is formed of $TiO_2$ and the second dielectric layer is formed of TiN, the two layers can sequentially be formed only by switching the types of the sputter gas. This fact significantly reduces production cost.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A magneto-optic memory medium, comprising:

a first dielectric layer having a first main surface and a second main surface, the first dielectric layer being formed of an oxide;

a second dielectric layer which directly covers the first main surface of the first dielectric layer, the second dielectric layer being formed of a material containing substantially no oxygen; and a magneto-optic memory layer which directly covers the second dielectric layer, wherein the second dielectric layer is thinner than the first dielectric layer and wherein a refractive index of the oxide is larger than a refractive index of the material containing substantially no oxygen.

2. A magneto-optic memory medium according to claim 1, further comprising a light transmitting substrate directly covered with the second main surface of the first dielectric layer.

3. A magneto-optic memory medium according to claim 1, wherein the second dielectric layer has a thickness in a range of 1.0 to 12.0 nm.

4. A magneto-optic memory medium according to claim 1, wherein the first dielectric layer is formed of $TiO_2$ and the second dielectric layer is formed of TiN.

5. A magneto-optic memory medium according to claim 2, further comprising a covering layer for covering the magneto-optic memory layer and thus for preventing oxidation of the magneto-optic memory layer through contact thereof with outside air.

6. A magneto-optic memory medium according to claim 3, wherein the first dielectric layer has a thickness in a range of 45.0 to 60.0 nm.

7. A magneto-optic memory medium according to claim 5, wherein the covering layer includes a third dielectric layer for which directly covers the magneto-optic memory layer and a reflection layer for covering the third dielectric layer.

8. A magneto-optic memory medium according to claim 5, wherein the covering layer includes a third dielectric layer for covering the magneto-optic memory layer, a fourth dielectric layer for covering the third dielectric layer, and a reflection layer for covering the fourth dielectric layer.

9. A magneto-optic memory medium according to claim 7, wherein the third dielectric layer has a refractive index smaller than the refractive index of the first dielectric layer.

10. A magneto-optic memory medium according to claim 8, wherein the fourth dielectric layer has a refractive index smaller than the refractive index of the first dielectric layer.

11. A magneto-optic memory medium according to claim 9, wherein the third dielectric layer is formed of a material selected from the group consisting LiF and $MgF_2$.

12. A magneto-optic memory medium according to claim 10, wherein the third dielectric layer is formed of SiN, and the fourth dielectric layer is formed of $SiO_2$.

13. A method for producing a magneto-optic memory medium, comprising the steps of:

forming a first layer of a dielectric oxide of a first element by performing reactive sputtering in an atmosphere of a first sputter gas using a material containing the first element as a target, the first sputter gas containing $O_2$;

switching the first sputter gas to a second sputter gas;

forming directly on the first layer, a second layer of a dielectric material containing substantially no oxygen so as to be thinner than said first layer, by performing reactive sputtering in an atmosphere of the second sputter gas using a material containing the first element as a target, the dielectric material containing substantially no oxygen having a smaller refractive index than a refractive index of the dielectric oxide of the first element; and forming a magneto-optic memory layer directly on the second layer.

14. A method according to claim 13, further comprising the steps of:

forming a third layer covering the magneto-optic memory layer by performing reactive sputtering in an atmosphere of a third sputter gas using a material containing a second element as a target;

switching the third sputter gas to a fourth sputter gas; and forming a fourth layer on the third layer by performing reactive sputtering in an atmosphere of the fourth sputter gas using a material containing the second element as a target.

15. A method according to claim 13, wherein the first element is Ti, the dielectric oxide of the first element first layer is $TiO_2$, and the dielectric material containing substantially no oxygen is TiN.

16. A method according to claim 14, wherein the third layer is a third dielectric layer formed of SiN, the fourth layer is a fourth dielectric layer formed of $SiO_2$, the second element is Si, the fourth sputter gas contains $O_2$, and wherein the third sputter gas contains $N_2$.

17. A method according to claim 15, wherein the second dielectric layer has a thickness in a range of 1.0 to 12.0 nm.

* * * * *